United States Patent [19]

Hamilton

[11] Patent Number: 5,696,438
[45] Date of Patent: Dec. 9, 1997

[54] ELECTRICAL HYBRID VEHICLE BATTERY CHARGING SYSTEM ARRANGEMENT

[76] Inventor: Albert L. Hamilton, 3516 Cortez, Dallas, Tex. 75220

[21] Appl. No.: 528,783

[22] Filed: Sep. 15, 1995

[51] Int. Cl.[6] .................................................. H02P 9/06
[52] U.S. Cl. ........................................ 322/12; 322/40
[58] Field of Search .......................... 322/4; 290/16, 290/45; 180/65 R

[56] References Cited

U.S. PATENT DOCUMENTS

| | | | |
|---|---|---|---|
| 3,497,026 | 2/1970 | Calvert | 180/65 |
| 3,939,935 | 2/1976 | Gill | 180/65 R |
| 4,218,624 | 8/1980 | Schiavone | 290/45 |
| 4,405,029 | 9/1983 | Hunt | 180/65 A |
| 4,923,025 | 5/1990 | Ellers | 180/65.2 |
| 5,359,308 | 10/1994 | Sun et al. | 335/216 |
| 5,492,189 | 2/1996 | Kriegler et al. | 180/65.2 |

*Primary Examiner*—Steven L. Stephan
*Assistant Examiner*—Nicholas Ponomarenko
*Attorney, Agent, or Firm*—Michael I. Kroll

[57] ABSTRACT

Electrical hybrid vehicle propulsion system in which a generators run directly from the drive shaft are employed to provide trickle charging of the battery when the vehicle is in operation. Mounted on the drive shaft is a rubber base molded adaptor with conical end walls and rubber wheels extending from the generators to engage the adaptor.

1 Claim, 2 Drawing Sheets

5,696,438

ELECTRICAL HYBRID VEHICLE BATTERY CHARGING SYSTEM ARRANGEMENT

BACKGROUND OF THE INVENTION

Field of the Invention

The instant invention relates generally to electric powered vehicles and more specifically it relates to a device for continually recharging an electric powered vehicle's batteries.

The vast majority of the engines used in motor vehicles today are powered by the combustion of fuels such as gasoline and diesel fuel. In an effort to avoid the problems associated with the burning of such fossil fuels (e.g. pollution and noise) much research has been directed to the use of alternative energy sources for motor vehicles. Because of their quiet and emission-free characteristics, electric-powered vehicles are being actively researched.

The commercial use of electric vehicles, however, has been limited. One reason for this is that electric powered vehicles tend to have a very limited range, that is, the batteries which power them must be recharged after only a short period of use. This recharging process can take several hours or more, during which the vehicle is out of service to the user. To minimize the inconvenience, it is common to use either larger batteries, or to connect several batteries together. Because of the weight of the batteries, however, this approach is not particularly satisfactory.

The instant invention takes advantage of the rotational motion of the drive shaft which is driven by such engines. When engaged with the rotating drive shaft of an electric powered vehicle, the instant invention provides a low-level ("trickle") charge to the engine's batteries, thus maintaining a full charge in the batteries.

SUMMARY OF THE INVENTION

A primary object of the present invention is to provide a universal power plant for the continuous recharging the batteries of an electric-powered motor vehicle.

Another object is to provide a universal power plant that utilizes the rotational motion of the drive shaft of an electric-powered motor vehicle for the continuous recharging of the motor vehicle's batteries.

An additional object is to provide a universal power plant for continually recharging the batteries of an electric-powered vehicle by means of a generator or alternator, or a plurality thereof, driven by the rotation of the drive shaft of the motor vehicle.

A still further object is to provide a universal power plant for the continuous recharging the batteries of an electric-powered motor vehicle that is simple and easy to use.

A still further object is to provide a universal power plant for the continuous recharging the batteries of an electric-powered motor vehicle that is economical in cost to manufacture and use.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
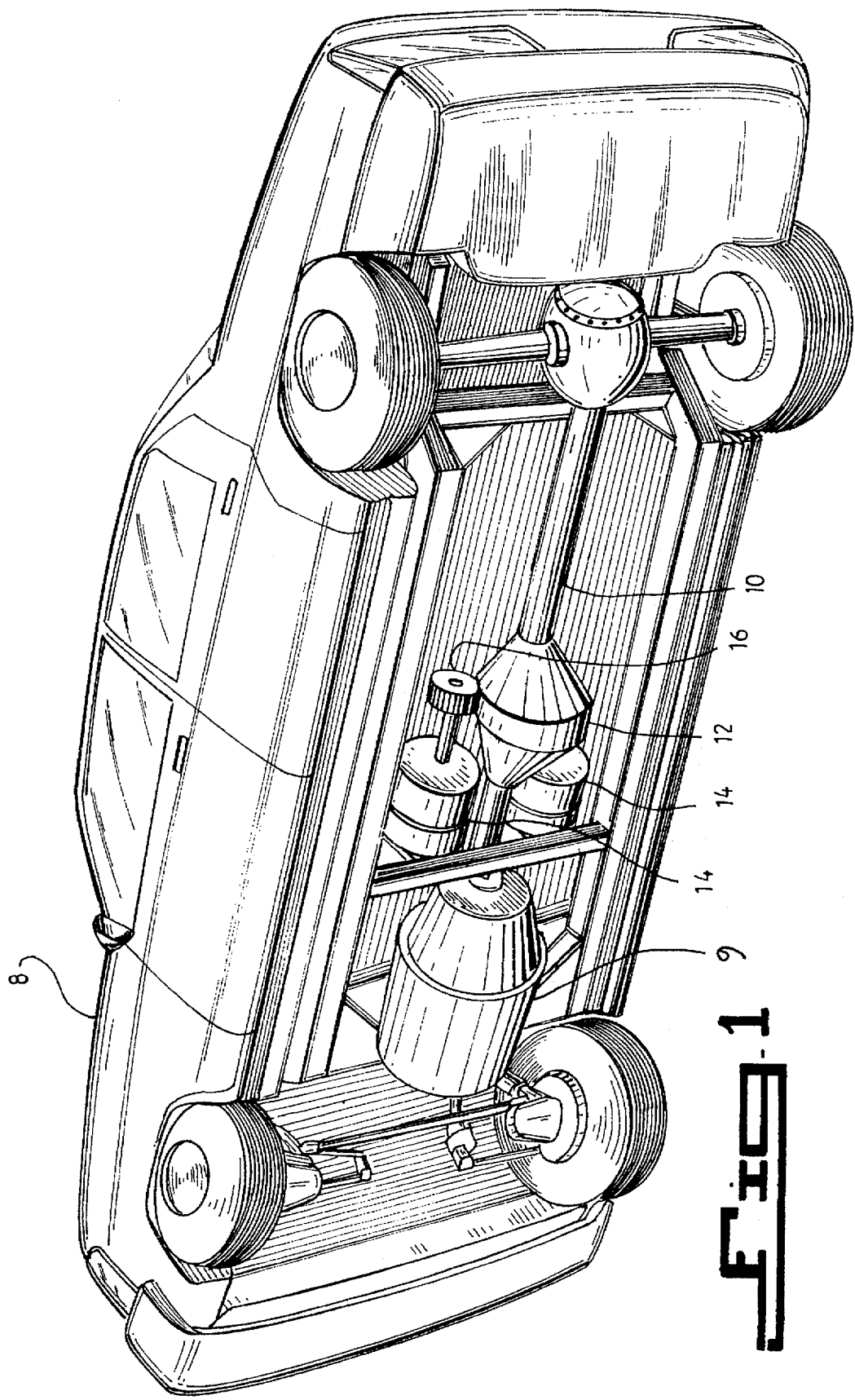
FIG. 1 is a perspective view of the underside of an electric-powered automobile adapted for use of the present invention.
Figure 2:
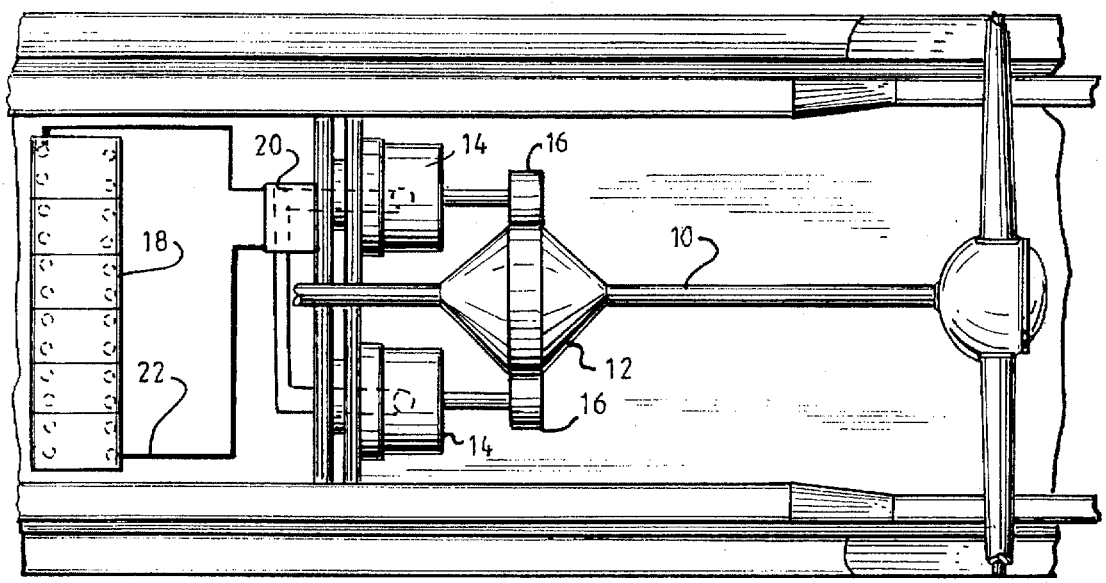
FIG. 2 is a further view of the underside of an electric-powered automobile, with various components not shown for clarity.
Figure 3:
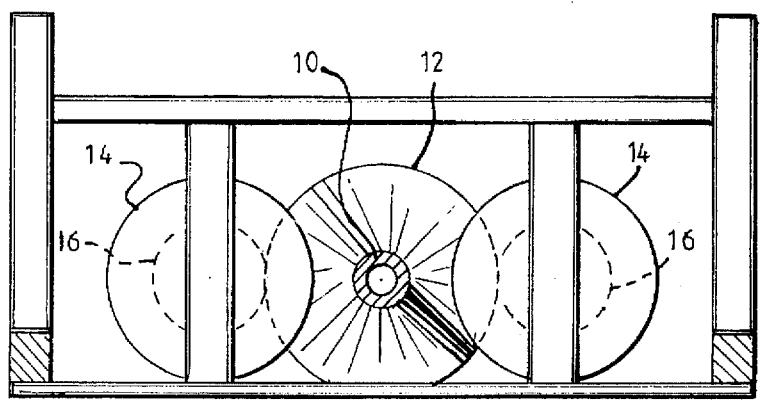
FIG. 3 is a cross-sectional view showing the relationship between the drive shaft and generators of the present invention.
Figure 4:
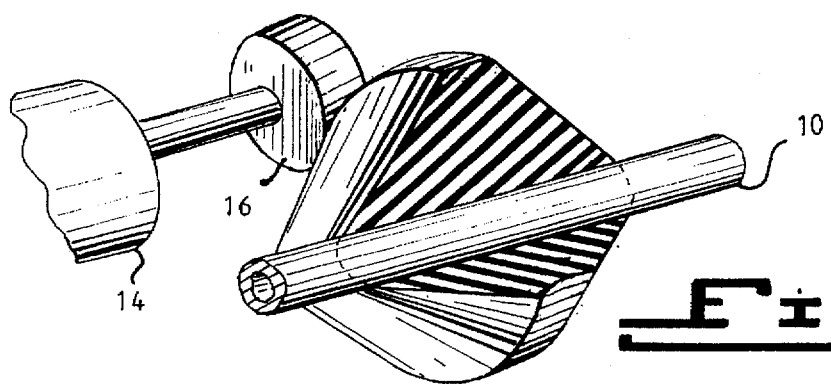
FIG. 4 is an oblique, exploded view of the drive shaft and generator of the present invention.

Turning now descriptively to the drawings, in which similar reference characters denote similar elements throughout the several views, FIGS. 1 through 4 illustrate a universal power plant for an electric-powered motor vehicle 8 of the type having a battery 18, with a prime mover unit 9 consisting of an internal combustion engine and an electric motor, each being capable of interchangeably rotating drive shaft 10, the universal power plant having a generator 14, means for mechanically engaging said generator with the rotating drive shaft of the motor vehicle, for example, via a rotatable rubber wheel 16 extending from the generator and which engages the rotating drive shaft, and means for electrically connecting said generator to the battery of the motor vehicle, for example, via standard electrical wires or cables 22 and a voltage regulator 20. To increase the mechanical efficiency of the invention, the diameter of the drive shaft can be increased, for example, by a rubber base 12 molded thereto.

It can readily be appreciated that, as the automobile is moving, the drive shaft rotates, and with it, the rubber base molded to the drive shaft rotates also. The rotatable rubber wheel which engages the rubber base is consequently rotated also. As the rubber wheel extends from the generator, the generator is activated and generates an electric charge. This charge is then used to recharge the automobile batteries by being connected thereto by conventional electrical wires/cables. It is expected that a voltage regulator will be connected in the circuit in order to modulate the recharging rate of the batteries.

In practicing the present invention, it can be readily appreciated that the size and electrical specifications of the various components will vary from application to application and will depend on the nature of the motor vehicle and its usage. The term "generator", as used herein, refers both to generators and alternators, and to any equivalents which generate an electical current when engaged. The calculations described below are illustrative of the present invention, and it can be readily appreciated that the universal power plant will provide an adequate "trickle" charge to maintain a full charge in the motor vehicle battery.

At 35 miles per hour, an automobile wheel will generally turn at approximately 436 rpm. With a standard 3:1 differential, the drive shaft will turn at about 1308 rpm. For a generator requiring a speed of 1500 rpm, $D_{alt}/D_{shaft}=$ $RPM_{shaft}/RPM_{alt}$. Thus $D_{alt}/3=1308/1500$, $D_{alt}=3924/1500=$ 2.62 inches. Accordingly, the ratio of the drive shaft to the generator shaft at 35 mph is 1.15:1. It can be readily determined if, and by how much, the drive shaft needs to be built up in order to achieve the proper rotation speeds for the generator.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A charging system for an electric-powered motor vehicle comprising:
   a) an electric-powered motor vehicle having a row of batteries and a rotating drive shaft, said batteries being located on the underside of said vehicle arranged in a line at right angles to the length of said vehicle with the drive shaft extending along a central axis of the vehicle, said row of batteries thereby being at right angles to said drive shaft;
   b) a pair of electric generators located on opposite sides of said drive shaft on the underside of said vehicle for charging said batteries;
   c) means for mechanically engaging said generators with the rotating drive shaft of the motor vehicle comprising an adaptor mounted for rotation on said shaft, said adaptor consisting of a rubber base molded on said shaft with a pair of conical end walls sloping outwardly and toward each other from said shaft to the outer edge of said adaptor and having an outer diameter larger than said shaft, and a pair of rotatable rubber wheels extending from and driving said generators frictionality engaged with said adaptor on opposite sides thereof so that there is rubber to rubber contact between said wheels and said adaptor;
   d) means for electrically connecting said generators to the batteries of the motor vehicle; and
   e) voltage regulator means between said generators and said batteries for controlling the voltage being delivered to said batteries.

* * * * *